United States Patent
Markoulidakis (10) Patent No.: US 8,233,891 B2
(45) Date of Patent: Jul. 31, 2012

(54) TELECOMMUNICATIONS NETWORK (75) Inventor: Yannis Markoulidakis, Nea Smyrni (GR)

(73) Assignee: Vodafone Group, PLC., Newbury, Berkshire (GB)

( * ) Notice: Subject to any disclaimer, the term of this patent is extended or adjusted under 35 U.S.C. 154(b) by 0 days.

(21) Appl. No.: 13/035,094

(22) Filed: Feb. 25, 2011

(65) Prior Publication Data

US 2011/0319062 A1    Dec. 29, 2011

(30) Foreign Application Priority Data

Feb. 25, 2010    (GB) .................................. 1003149.0

(51) Int. Cl.
*H04W 4/16*    (2009.01)
(52) U.S. Cl. ..................................... 455/415; 455/456.1
(58) Field of Classification Search .................. 455/415, 455/466, 456.1, 457, 416, 410, 556.2, 418; 340/870.07; 345/629

See application file for complete search history.

(56) References Cited

U.S. PATENT DOCUMENTS

| | | | |
|---|---|---|---|
| 6,321,093 B1 | 11/2001 | Dalal | |
| 7,206,573 B1 | 4/2007 | Weaver et al. | |
| 7,668,109 B2 | 2/2010 | Veres et al. | |
| 2005/0032527 A1* | 2/2005 | Sheha et al. | 455/456.1 |
| 2007/0189272 A1 | 8/2007 | Hutchinson et al. | |
| 2007/0190956 A1 | 8/2007 | Chen et al. | |
| 2008/0248795 A1 | 10/2008 | Petersen et al. | |
| 2010/0124915 A1* | 5/2010 | Haitani et al. | 455/415 |
| 2011/0263236 A1* | 10/2011 | Linkert et al. | 455/415 |

FOREIGN PATENT DOCUMENTS

| | | |
|---|---|---|
| CN | 101472248 | 7/2009 |
| WO | WO-2007/092560 | 8/2007 |

OTHER PUBLICATIONS

GB Search Report for GB1003149.0.

* cited by examiner

*Primary Examiner* — Phuoc Doan
(74) *Attorney, Agent, or Firm* — B. Aaron Schulman, Esq.; Stites & Harbison PLLC.

(57) ABSTRACT

In a telecommunications network including a plurality of mobile terminals, a method of analysing missed call events in relation to at least one of the plurality of mobile terminals, the method including: determining the occurrence of a missed call event; recording the missed call event in a database, including an identity relating to the called terminal; determining and allocating a status of the called mobile terminal to the missed call event, the status selected from a plurality of options, with at least one option relating to an unreachable terminal situation; and analysing the missed call event data relating to unreachable situations to identify the existence of any patterns relating to a particular called terminal/user, called terminal type, location and/or time period. The method may also be embodied in a network element, such as a Call Alert Application Server.

15 Claims, 4 Drawing Sheets

TELECOMMUNICATIONS NETWORK

FIELD OF THE INVENTION

The present invention relates to a cellular telecommunications network and the management thereof. More particularly, the present invention relates to a system and method for managing voice call events, particularly missed calls, and even more particularly missed calls to mobile terminals due to the terminals not being reachable, such as would occur in out of coverage situations. Even more particularly, the present invention relates to a system and method for providing network data analysis in relation to missed call events due to out of coverage situations.

BACKGROUND

In mobile/cellular network performance analysis, the rate of missed calls for a user is a Key Performance Indicator (KPI), and there are a number of situations where a missed call may occur, including where:
 (a) the called user's mobile terminal was switched off: i.e. turned off by the user or by the terminal itself in the event of a depleted battery, both of which result in the terminal sending a network detach message before shutting down; this case also includes the de-activation of mobile network access without shutting down the terminal (e.g., flight-mode).
 (b) the called user was busy: i.e. on another call or not answering the ringing terminal; and
 (c) the called user was not reachable/non-contactable by paging procedure indicating out of coverage or other conditions with the same effect: i.e. terminal attached to the network, but non-responsive to the paging message sent by the network on the occurrence of the incoming call.

From a customer viewpoint, the first two missed call situations, (a) and (b) listed above, are generally acceptable, since they are within the user's control. The third point (c), however, is out of the user's control, and therefore likely to cause dissatisfaction and be viewed as a service inadequacy.

The problem of the terminal entering a non-reachable state may be due to a number of issues, such as:
 i) network coverage extent or continuity problems (i.e. the user of the mobile terminal may have moved and entered a region with no signal coverage or with only a weak signal coverage);
 ii) user's terminal associated problems (e.g. terminal antenna sensitivity, performance of the terminal receiver, etc.);
 iii) the network protocols and standards associated problems (e.g. 3GPP operational standards);
 iv) rarely occurring conditions e.g. local interference in paging channels; or
 iv) any combination of the above.

The nature of the out-of-coverage problem varies depending on the specific situation e.g. a user moving in remote rural areas where there is no coverage may experience long periods of out-of-coverage status while other cases, like entering the elevator or an underground parking, may lead to out-of-coverage situations of limited duration. It should be noted that according to the GSM and UMTS standards as soon as the terminal returns back to coverage then a location registration procedure is initiated notifying the network that the terminal is attached and reachable.

A common problem for mobile terminals with a choice of coverage occurs when the terminals are in idle mode. In idle mode, mobile terminals are configured to select the best available service cell (cell selection and re-selection procedure). Therefore, when in a region where good coverage of multiple cells is available (e.g. from both 2G cells and 3G cells), a 2G/3G terminal may be likely to regularly switch between the 2G and 3G cells depending on the 3G signal quality. This switching, although generally transparent to the user, does result in the terminal being out of coverage and not reachable for a very short period of time during this cell reselection process (it may reach the order of a few seconds). In cases of problematic 3G signal strength levels the terminal can regularly be switching between 2G and 3G cells, leading to a phenomenon where this short out of coverage time period is effectively accumulated and multiplied. The actual period of time that the terminal is out of coverage typically varies depending on the operation software on the terminal, and accordingly the terminal type. During this period, any incoming calls would not be able to connect with the terminal, and a missed call due to coverage problems would result. With the introduction of 4G systems (e.g. Long Term Evolution or LTE technology) where the terminals will switch between 2G, 3G and 4G cells this type of problem may become even more intense and annoying for the users.

Out of coverage situations are difficult to analyse based on network measurements, particularly in terms of their duration, because when terminals are out of coverage they have no interaction with the network.

There is therefore a need to be able to better recognise and analyse problems arising from missed calls, particularly those due to out of coverage events.

There is also a need to be able to better provide customer centric management for telecommunication network providers.

Customer centric management is an area of network data analysis which considers the ability to provide KPIs on a per MSISDN basis (i.e. a per user basis) in order to provide a characterisation of individual customer experience. This analysis is very useful, particularly for addressing customer complaints (such as due to a large number of missed calls outside their control), and also tracking the Service Level Agreements (SLAs) offered to corporate customers.

To date customer centric management systems typically rely on two main techniques, namely Call Detail Record (CDR) analysis (for off-line analysis of customer experience) and passive probing systems (for near real time analysis of customer experience). These techniques allow for the analysis of a wide variety of parameters, however they do not actually capture the events associated with incoming calls while the called terminal is out of coverage. More specifically, for CDR analysis, out of coverage analysis is not possible because such information is not included in the CDR. For passive probing systems out of coverage analysis would only be possible on a complex series of settings to the Visitor Location Register (VLR) nodes. These settings would not only be complex to implement, but would only be able to be implemented on a limited scale since such a configuration would result in an additional VLR processing load. This is undesirable, and so there is also a need for an improved analysis technique.

SUMMARY OF THE INVENTION

According to a first aspect the present invention provides, in a mobile telecommunications network including a plurality of mobile terminals, a method of analysing missed call events in relation to at least one of the plurality of mobile terminals, the method including: determining the occurrence of a missed call event; recording the missed call event in a database, including an identity relating to the called terminal; determining and allocating a status of the called mobile terminal to the missed call event, the status selected from a plurality of options, with at least one option relating to an unreachable terminal situation; and analysing the missed call event data relating to the unreachable terminal situations to identify the existence of any patterns relating to a particular called terminal, called terminal type, location and/or time period.

Preferably the at least one unreachable terminal status option relates to one or more of the following situations: the called terminal being registered as active in the network; and/or the called terminal being non-responsive to a paging event.

According to a further aspect, the present invention provides, in a mobile telecommunications network including a plurality of mobile terminals, a method of analysing missed call events in relation to at least one of the plurality of mobile terminals, the method including: determining the occurrence of a missed call event; determining a status of the called mobile terminal in relation to the missed call event; and recording the missed call event in a database, including an identity relating to the called terminal and the called terminal status.

Preferably this further aspect further includes analysing the missed call event database in order to identify the existence of any patterns relating to a particular called terminal, called terminal type, location and/or time period.

Other aspects of the invention are set out in the attached claims.

These aspects of the invention can advantageously associate call events with customer experience. That is, the analysis of the missed call events may be utilised to assess, and thereafter improve, a user's mobile terminal usage experience by identifying unreachable terminal situations, particularly out of coverage situations, and determining the cause, or at least a likely cause.

Advantageously, these aspects of the invention are able to exploit the fact that missed call SMS alert services typically trace and store all missed call events in the determination of a missed call event, thus allowing a convenient and effectively zero cost basis from which to determine unreachable terminal events and/or analyse customer experience related to missed calls due to an unreachable terminal. In this regard, networks typically store a list of the missed call events with information relating to the calling number and the time that the missed call took place. Based on this information the network prepares an appropriate SMS message which includes summarised information on the missed calls that took place while the terminal was not reachable.

BRIEF DESCRIPTION OF THE DRAWINGS

For a better understanding of the present invention a number of embodiments will now be described, by way of example, with reference to the accompanying drawings, in which.

DETAILED DESCRIPTION

Figure 3:
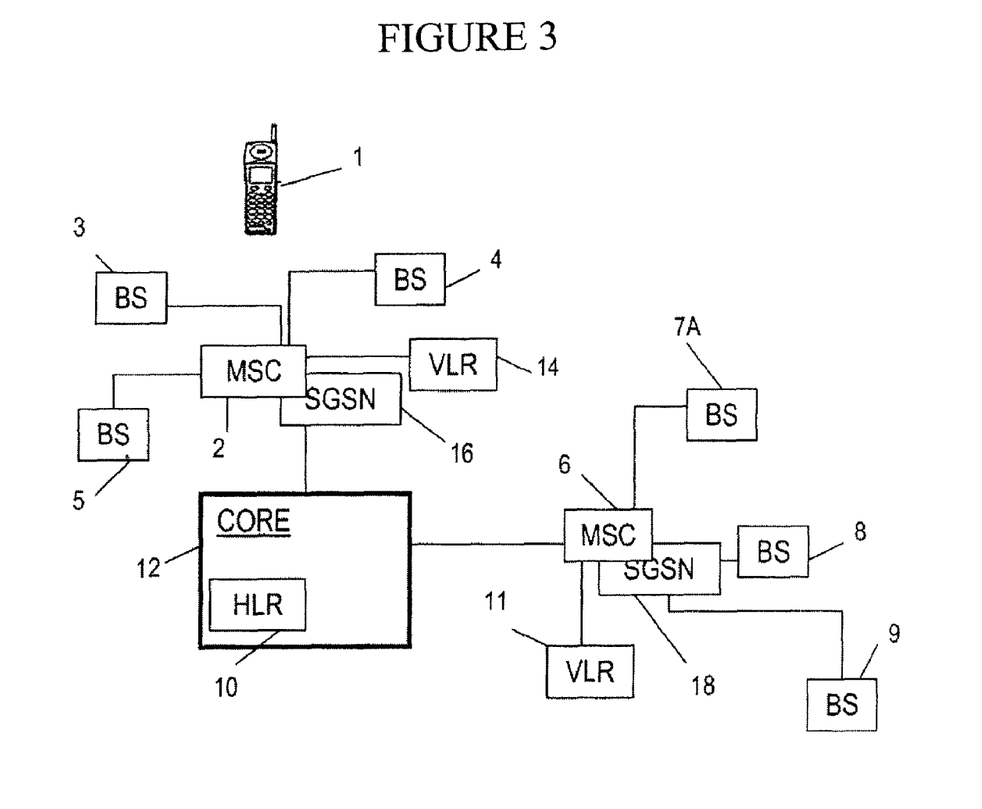
FIG. 3 illustrates an example telecommunication system architecture useful in describing embodiments of the invention.

FIG. 3 illustrates an example telecommunications network configuration in which embodiments of the present invention may be implemented.

The mobile terminal (MS) is shown in FIG. 3 at 1. The mobile terminal may be any suitable portable device, including a handheld mobile telephone, a personal digital assistant (PDA), dedicated traffic navigation device or a laptop computer equipped with a network connectivity datacard.

The cellular/mobile telecommunication network illustrated includes number of base station subsystems, where each base station subsystem (BS) serves a respective cell or group of cells within a radio access network. The mobile terminal will register with a cell within one BS, typically the one providing it with the strongest signal (usually, but not necessarily, the closest BS) in order to be able to send and receive communications across the telecommunications network.

In currently deployed cellular networks there are typically two different Radio Access Technologies: a second generation (2G) design following the GSM radio access standards and a third generation (3G) design following UMTS Terrestrial Radio Access Network (UTRAN) design. A 4G access standard, Long Term Evolution (LTE) is currently under development, so in the future there may also be further access standards coexisting.

The term "base station" refers hereafter to: a base transmission station (BTS)—in the 2G GSM standards; a "node B"—in the 3G UMTS standards; an "eNode B"—in the proposed 4G LTE standard; and any network entity that performs analogous functions to the preceding entities.

In a 2G mobile telecommunications network, such as GSM, each base station subsystem (BS) comprises at least one base transmission station (BTS) and a base station controller (BSC). The BSC typically controls more than one BTS. The BTSs and BSCs together comprise the 2G radio access network (RAN).

In a 3G mobile telecommunications network, such as UMTS, each base station subsystem comprises at least one node B and a radio network controller (RNC). An RNC may control more than one node B. The node Bs and RNCs comprise the 3G radio access network.

In the proposed 4G LTE mobile telecommunications network, each base station subsystem comprises an eNode B which combines certain functionalities of a 3G RNC and a Node B. These eNode Bs are arranged in groups and each group of base stations is likely to be controlled by a Mobility Management Entity (MME) and a User Plane Entity (UPE). Since LTE is not yet implemented, this architecture may change.

The exact network configuration is not essential to the invention, so of course other mobile network configurations are possible.

Conventionally, in a UMTS network, the base stations and their controllers are themselves arranged in groups and each group of base stations and controllers is controlled by a node in the core network. This core network node is referred to in the standards as a Media gateway (MGW)—but not illustrated in FIG. 3—the operations of this node are governed by the MSC 2 (for circuit switched data) or a serving GPRS support node (SGSN), such as SGSN 16 for base stations 3, 4 and 5 (for packet switched data). As shown in FIG. 3, the network has another SGSN 18, which is controlling a further three base station subsystems 7, 8 and 9. In practice, the network will incorporate many more base station subsystems than shown in FIG. 3.

The SGSNs 16 and 18 are provided to support communications in the packet switched domain—such as GPRS data transmissions. The SGSNs 16 and 18 are in turn connected to a gateway GPRS support node (GGSN—not shown), which provides a gateway to data networks, such as the Internet.

Each mobile terminal, to be communicable with the telecommunications networks, is typically provided with a smart card or SIM which identifies the subscriber to the network. In this regard, the SIM card is pre-programmed with a unique identification number, the "International Mobile Subscriber Identity" (IMSI), for use by the networks. Another identifier is the MSISDN, which is the telephone number which uniquely identifies the user's network subscription. When a terminal is registered with a BS, and therefore is attached to the network, a home location register (HLR) 10 in the network stores a unique terminal identifier, typically the IMSI, along with the BS identity, so that network traffic can be correctly directed towards the mobile terminal.

For instance, network traffic that would be directed towards a mobile terminal attached to the network would include paging requests for incoming calls. Paging is a process of broadcasting a message for a specific terminal, which alerts the terminal to take some action—for example, to notify the terminal that there is an incoming call/message to be received. According to the relevant standards the mobile network will broadcast the paging request in the set of cells comprising the location area in which the terminal has been registered as being attached to the network.

Where the mobile terminal receives the paging request, it will transmit a paging response acknowledgement to the base station, which is in turn forwarded to the MSC/SGSN, and a user plane session can be established between the mobile terminal and the relevant core network node (MSC/SGSN). For instance, for an incoming call, this communication set up will initiate an alert for the user of the terminal, such as a ringing alert. If the ringing alert goes unanswered (i.e. after a predetermined period of time has expired), then a missed call message will be transmitted back to the core network via the serving MSC/SGSN, indicating that the call went unanswered by the user. Similarly, where the mobile terminal is engaged on another service and is unable to receive the incoming call, a message that the user is "busy" will be transmitted back to the originating core network node.

If however, the mobile terminal is switched off, a paging message will not be initiated, as the core network will be aware that the terminal is detached from the network, due to the standard "detach" message being sent during the terminal shut down process (specific case of location registration procedure). In this instance, the core network may direct the incoming call directly to the mobile terminal user's voice message service, if applicable.

In a still further "missed call" situation, the mobile terminal may be attached to the network and idle but not able to receive the paging message. In this regard, there is a possibility, and sometimes a not uncommon situation, that despite a terminal being active and registered with the network, the network is unable to make contact with the mobile terminal.

For instance, this non-contactability may be due to the user of the mobile terminal having moved and entered a black-spot coverage region (e.g. into a building or an underground car park with no or little mobile phone coverage). Alternatively, the mobile terminal may be in the process of reselecting a different serving cell when the page was incoming, so that the cell used to page the mobile terminal is no longer the terminal's serving cell. Whilst it may be thought that the reselection example would be rare and highly unlikely to occur to any great extent, it has been found that some mobile terminals are more susceptible to initiating a location area update/cell reselection more frequently than others, particularly when located on the edge of a cell, and have two or more adjacent cells providing a similar signal strength (the measurement by which cell reselection is typically based). In this situation the mobile terminal may "indecisively" switch between the different cells trying to get the best possible coverage, which would unfortunately result in an intermittently interrupted service for the user and potentially a greater number of missed calls than usual.

Figure 1:
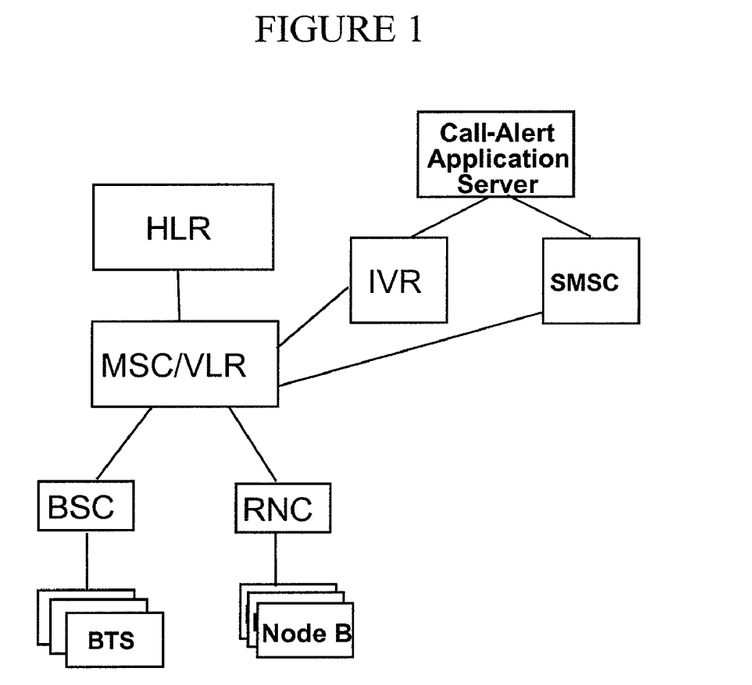
FIG. 1 illustrates an example architecture of an SMS missed call alert service in accordance with the prior art.

These "missed call" events can be recorded by the network, by storing information related to the called and calling numbers and the time that the missed call took place. In this regard, FIG. 1 illustrates a Call Alert Application Server integrated into a 2G/3G network such that it is communicable relation with the main nodes of the mobile network architecture (i.e. HLR, MSC/VLR, BSC/RNC, BTS/Node B).

The purpose of the Call alert Application Server is to provide subscribers with a notification of a missed call, so that missed calls are transparent to mobile users. When a missed call is registered, the Call Alert Server of FIG. 1 is further configured to monitor when the called terminal becomes reachable again. This may be determined in a number of ways, including by monitoring when the terminal re-registers/attaches to the network, or when the terminal invokes a location registration procedure. The Server will then notify the terminal of the missed call.

In this regard, the Call Alert Application Server, upon the occurrence of one or more incoming calls which could not reach a user that has subscribed to this service, will issue an SMS message with information associated with the missed call. The SMS message is delivered to the user as soon as their mobile terminal becomes reachable again. With reference to FIG. 1, this SMS notification will be sent via the SMSC. The Server may also be associated with an IVR (Interactive Voice Response) node which is configured to inform Party A about the fact that Party B will be informed of the attempted communication as soon as he/she becomes reachable.

The Call Alert Application Server is an example of a network element able to record the missed call events. It should be noted that the implementation of the Call Alert Application can be based on various options including a standalone server or integrating this functionality to an IN (Intelligent Network) server, the SMSC, etc. Therefore the reference to the Call Alert Application Server actually refers to the node that implements the logic of the Missed Call Alert service.

Figure 2:
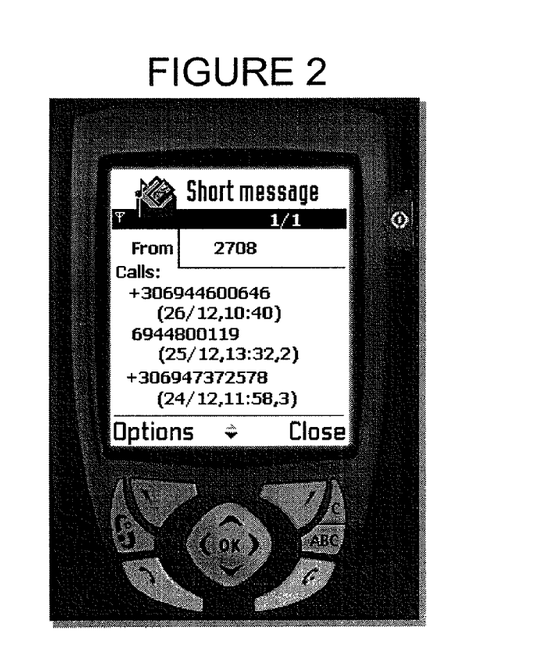
FIG. 2 illustrates an example missed call alert SMS.

FIG. 2 illustrates an example of the content such a missed call SMS message may contain, namely an identifier of the calling party (such as their phone number or a name), the time and/or data of the call, and the number of times that that party has called. More specifically, the message shown in FIG. 2 indicates that the user has missed calls from three different parties, and the time and date of each of those calls. For instance, a call was missed from +306944600646 on 26/12 at 10.40 am. Two calls have also been missed from +306944800119, with the last missed call on 25/12 at 1.32 pm. Similarly, three calls were missed from +306947372578 with the last call being on 24/12 at 11.58 am. In this example, numbers have been used to identify the calling parties. Other descriptions are of course possible, particularly where the user has a record in their address book for the calling party: in this instance the description used in the address book record may be utilised.

According to an embodiment of the invention, the following table provides an example of the type of additional data that may be gathered by the Server:

TABLE 1

| A number (i.e. calling party) | B number (i.e. called party) | Date | Time | Type/ Reason |
|---|---|---|---|---|
| +306944600646 | +306944454256 | 26/12/2009 | 00:03:45 | Busy |
| +306945763489 | +306946120034 | 26/12/2009 | 00:12:01 | Unanswered Paging |
| +306932459478 | +306945576130 | 26/12/2009 | 01:24:38 | Switched Off |
| +306977203459 | +306952628990 | 26/12/2009 | 02:12:22 | Switched Off |

That is, the server is configured to intercept, or the core network is configured to send, the information listed in the Table 1. The calling party identity (Party A), called party identity (Party B), date and time information is the standard data set transmitted and shared in the network, and so is readily obtained. According to this first embodiment of the invention, information defining the type of missed call, or the reason for the missed call occurring is also collected. To obtain this information on the type of missed call, additional analysis needs to be performed.

This can be achieved in the MSC/VLR node where at the occurrence of a missed call the reason of the missed call is known based on the signalling messages exchanged and potentially the type of expired timers that have led to the case of a missed call. For example paging procedure is considered unsuccessful in the case a relevant timer has expired, and depending on the network configuration selected by the operator, the procedure has been repeated more that once. Therefore the MSC/VLR node that produces the signal towards the Missed Call Alert Server can incorporate the missed call specific case in this message. As described above three different missed call cases can be considered: (a) called party is detached, (b) called party is busy or not answering the call and (c) called party could not be reached through paging procedure.

Further information may also be recorded in relation to the missed call data of FIG. 1, such as location information. For instance, where the mobile terminal is considered attached to the network (in terms of the last registered location area), but is non-responsive to paging messages, the last known Location Area (LA) in which the mobile terminal was located may be recorded.

The information compiled in Table 1 can then be used to identity problems that cause the missed call events, particularly in relation to out of coverage events which are most likely to result in customer dissatisfaction. In this regard, according to a further embodiment of the invention, the information can be used to identify patterns in the data in relation to specific users or group of users, particular locations (e.g. location areas), particular types of terminals and/or particular time zones of the day (e.g. users facing out-of-coverage problems in peak traffic hours would be more annoyed by such events).

The above described analysis of user experience is particularly important since users that experience a high number of missed incoming calls due to non-contactable terminal situations (as measured by unsuccessful paging events), will almost certainly be facing similar implications in their ability to make outgoing calls (note that user attempts to make calls while out of coverage cannot be traced by the network due to the lack of communication capability).

A wide variety of problems which cannot be detected through standard network statistics can be identified through such an analysis. For example the analysis can reveal the actual experience of particular customers complaining about coverage problems or the experience of the set of terminals of a corporate account for which a Service Level Agreement (SLA) may be in place. Based on the location areas where missed calls are being experienced, combined with additional input from the customer side, it is possible to identify specific spots (e.g. the customer premises) which may lead to the solution of such problems (e.g., installation of signal boosters at customer premises, introduction of a micro base station, etc.).

Moreover, the analysis of missed calls due to coverage problems can contribute towards the assessment of the performance of terminals (e.g. receiver performance, 2G/3G/4G selection procedure efficiency) and/or the network performance such as the paging procedure performance, etc. Given the evolution of mobile networks with multiple access technologies (2G/3G/4G) operating simultaneously and the increasing complexity of terminals (terminals are gradually becoming handheld PCs) such type of performance analysis is an essential capability for mobile operators.

According to a further embodiment of the invention, the information compiled in Table 1 can be used in benchmarking terminal idle mode operation performance. In other words, this further embodiment relates to categorising non-contactable terminal events in relation to terminal types or sets of terminals. The identified types/sets of terminal could be as specific as a terminal model number, a terminal manufacturer, the software operating system (OS) run on the terminals (i.e. such as the iPhone platform, any of the Windows Mobile™ OS versions or any of the Symbian™ OS versions), or even the types of radio access technologies supported (e.g. 2G, 2G/3G, 2G/3G/4G terminals), etc. To identify terminal models with potential performance problems, its performance can be benchmarked against a threshold like, for example, the average of performance of all terminal models in the same network. Moreover, in order to ensure a fair comparison between terminal models' performance the number of experienced missed calls due to coverage problems can be normalized to the total number of terminating calls per terminal model (the latter parameter can be derived from CDR off-line analysis).

This embodiment of the invention could also be used in the case of a terminal or set of terminals with a known performance problem, which leads to an increased number of incoming missed calls. Where this is found to occur for a particular user's terminal, and their terminal is one with such a known performance problem, then the user could be quickly advised to change their mobile device in order to overcome the issue. In this way, the collected data can be analysed to confirm that an out of coverage problem does exist for the user, and to suggest a solution where their mobile device type can also be identified.

In addition the outcome of terminal performance analysis can be provided as an input to terminal manufacturers in order either to fix the problem for the existing terminals if possible (e.g. through an updated software release) or to take this into account in the design of future mobile terminals. Moreover, it may allow for a Service Level Agreement (SLA) to be established between mobile operators and terminal manufacturers regarding the terminal performance.

Figure 4:
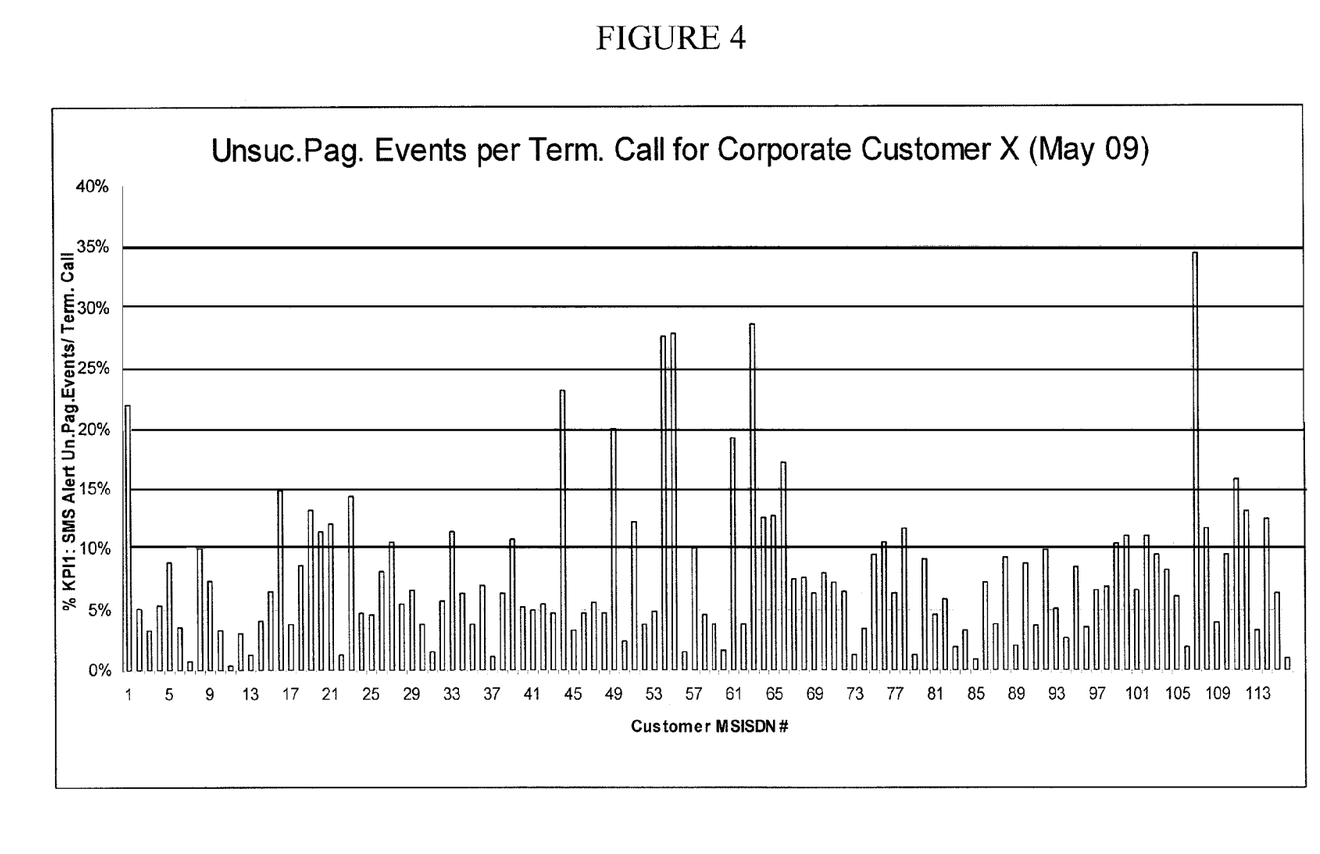
FIG. 4 illustrates a graph of a first key performance indicator based on unsuccessful paging events for a plurality of different terminals.

In regard to this embodiment of the invention, FIG. 4 illustrates a graph of a Key Performance Indicator (KPI) measurement for a plurality of different customer MSISDNs, numbered sequentially in the figure for ease of reference. This Figure was prepared from data collected for a real corporate customer who raised a coverage issue complaint.

The KPI illustrated in FIG. 4 is the number of unsuccessful paging events against the sum of successful incoming calls plus the number of missed calls due to unsuccessful paging attempts, in order to show the ratio between the two for each user, i.e.:

$$\text{(unsuccessful paging events)/(successful incoming calls+unsuccessful paging events)} \quad (1)$$

It is to be appreciated that the KPI analysis of FIG. 4 does not consider the missed calls associated with cases where the called terminal is busy or switched off, since in these cases, the user is aware of his/her uncontactability.

The KPI illustrated in FIG. 4 can be therefore be used in customer experience analysis. In this regard, there are several users whose KPI is higher than average, indicating that those users are experiencing a greater number of unsuccessful paging events than a specific threshold (e.g. the average rate of missed calls for all terminals in the network). For instance, if the threshold in the example of FIG. 4 was considered to be 25% or less, users represented by numbers 54, 55, 63 and 107 all have a KPI greater than 25%, which is undesirable. This analysis would therefore indicate that problems exist in regard to the experience of these users. This analysis advantageously could be used by a network operator in order to take some retention actions for a targeted group of customers.

With the problematic MSISDN numbers identified, it is then possible to determine the type of terminal being used. Where certain terminal types are known to have problems in regard to out of coverage situations, the user of the terminal could simply be notified if it is found that their terminal is suffering the known problem. For instance, a specific problem that this analysis can be used to identify is a missed call event pattern due to a mobile terminal repeatedly switching between cells.

Ideally the analysis of these embodiments of the invention is performed on a regular basis in order to quickly identify problems as they arise. For instance, the analysis may be compared with network changes (e.g. software upgrades in the radio access or in the core network, hardware modernization, massive network re-configurations, introduction of new functionality like HSDPA or even a new radio access technology like LTE, etc.), with a view to identifying any network changes that have caused any problems. In a similar manner the data may be compared with networks operating in different localities in order to identify problems that may exist in theoretically equivalent environments.

In another embodiment of the invention the customer experience or terminal performance can be benchmarked between mobile networks operating in the same or different regions. The outcome of such a network benchmark can be exploited in network roaming agreements or can lead to a comparison of network design methodologies and parameters in order to identify best practices in this field (e.g. optimization of radio network configuration parameters).

Figure 5:
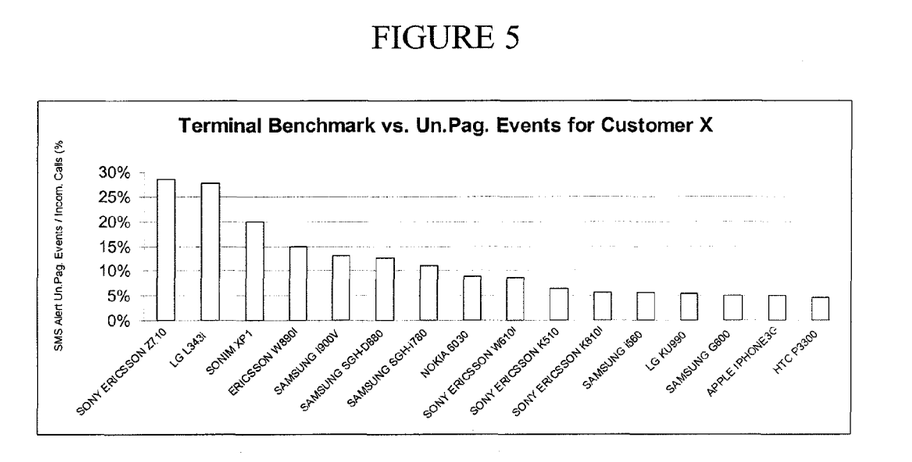
FIG. 5 illustrates a graph of terminal benchmarking according to the rate of unsuccessful paging events per terminal type.

As already described, in another embodiment of the invention, the out of coverage data may be used to benchmark and compare different terminal types, in order to determine if a problem exists in a particular terminal type. This is illustrated in FIG. 5. To achieve this analysis on a per device type basis, it is necessary to identify the device type which is being used for each MSISDN experiencing the missed calls. This information can be determined from the IMEI, as the first eight digits of this number uniquely identify the terminal model. The IMEI can be easily derived from off-line CDR analysis where the IMEI information of the calling MSISDN is included.

Based on the association of MSISDN to IMEI, it is then possible to estimate the KPI as per FIG. 4 (see equation 1 above) and rank the available devices by this KPI, which is shown in FIG. 5. In this embodiment of the invention, where several users are determined to be using the same terminal type, the calculations for these users are combined. Assuming as an example threshold for this KPI the level of 25% or less, then FIG. 5 shows that for the collected data, there are two terminal types for which the KPI ratio exceeds 25%, which is undesirable, and suggesting that possibly a problem exist in the performance of these terminals, which may be due to the time the terminals take to apply cell reselection between 2G and 3G networks, being a time period they are unreachable. Identifying such a problem enables the terminal manufacturer to make improvements to the terminal's operability, and potentially offer a software upgrade to existing users which addresses the problem.

It is to be appreciated that this analysis may also be performed on the basis of the terminal's operating system or manufacturer identity by further groupings of the data once the terminal types are identified. Regular benchmarking reports may then be prepared based upon the analysis.

Moreover, in practice users may change terminals over time. This event can be revealed from the CDR analysis where different terminal models can be identified through the relevant IMEIs. In such a case the analysis presented above can be exploited to analyse the impact of terminal change on the missed call experience for the particular user.

FIGS. 4 and 5 were prepared based on the unsuccessful paging events data as collected. However, it is to be appreciated that in practice, whilst a given called party is unreachable, one particular calling party may make multiple attempts to contact them. Since this can cause an aberration in the results, filtering can be applied to the data to ensure that the actual demand corresponds to a single incoming call and not to multiple ones. Therefore, in another embodiment, the KPI analysed is:

$$\text{(Filtered Unsuccessful Paging Events)/(Incoming Calls+Filtered Unsuccessful Paging Events)} \quad (2)$$

More specifically, the Filtered Unsuccessful Paging Events may be defined based on filtering out multiple attempts from the same calling party (A number) within a time period where the called user has remained uncontactable (i.e. until the called party performs a location registration or a missed call alert message is forwarded to the called party). Therefore, to achieve this filtered analysis, in addition to the list of missed calls per MSISDN, a list of when location registrations/updates are performed or a list of SMS alert message delivered to the MSISDN would also be required.

In a further embodiment of the invention, the analysis can simply be in regard to the MSISDNs that experience the highest number of unsuccessful paging events. The rationale for this analysis is that regardless of the number of incoming calls per MSISDN, if the number of missed calls exceeds a certain threshold, then the user will become concerned of the problems associated with network coverage or the terminal performance in idle mode operation. The following Table 2 includes data collected in this regard.

The data was collected over a period of a month, specifically in May 2009. As a comparator, the number of dropped calls experienced by each of the same MSISDNs during the time period is also recorded to determine if there is any correlation between the two data sets.

TABLE 2

|    | Number of SMS Alerts (May 2009) | Orig. Dropped Calls (May 2009) |
|----|----|----|
| 1  | 75 | 8  |
| 2  | 71 | 5  |
| 3  | 69 | 4  |
| 4  | 63 | 4  |
| 5  | 62 | 6  |
| 6  | 59 | 5  |
| 7  | 54 | 0  |
| 8  | 52 | 2  |
| 9  | 48 | 9  |
| 10 | 42 | 2  |
| 11 | 41 | 3  |
| 12 | 37 | 6  |
| 13 | 36 | 1  |
| 14 | 36 | 0  |
| 15 | 35 | 3  |
| 16 | 35 | 2  |
| 17 | 34 | 0  |
| 18 | 32 | 3  |
| 19 | 32 | 2  |
| 20 | 32 | 6  |
| 21 | 30 | 1  |
| 22 | 29 | 4  |
| 23 | 28 | 0  |
| 24 | 28 | 1  |
| 25 | 28 | 7  |
| 26 | 27 | 6  |
| 27 | 27 | 3  |
| 28 | 27 | 1  |
| 29 | 25 | 2  |
| 30 | 25 | 0  |
| 31 | 25 | 1  |
| 32 | 24 | 3  |
| 33 | 23 | 3  |
| 34 | 22 | 5  |
| 35 | 21 | 15 |
| 36 | 21 | 3  |
| 37 | 21 | 2  |
| 38 | 21 | 4  |

A threshold value of 20 has been applied to the unreachable event data shown in Table 2, so that only terminals experiencing greater than 20 missed call events are included in the Table. It is to be appreciated that the threshold of 20 selected in this example may be adjusted as considered applicable.

Figure 6:
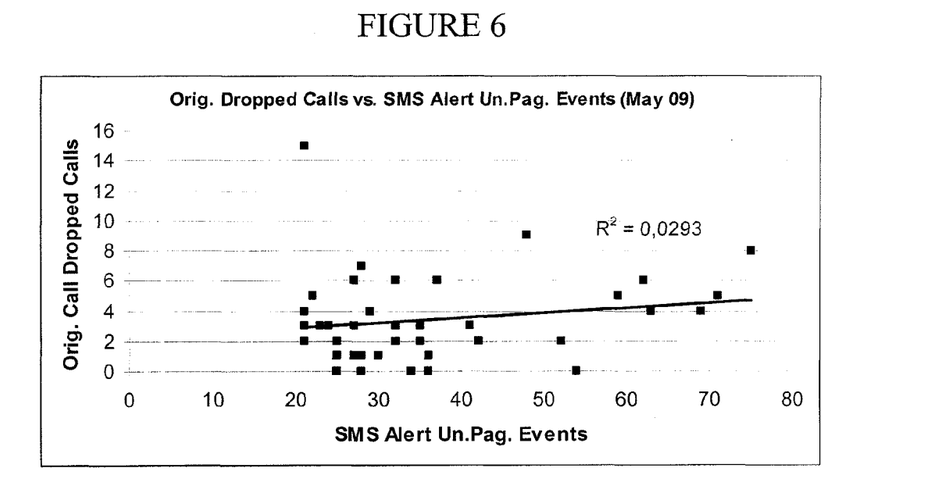
FIG. 6 illustrates a graph presenting the correlation between unsuccessful paging attempts and the dropped calls for a number of users.

The data of Table 2 is illustrated graphically in FIG. 6, and effectively shows that there is no correlation between the number of dropped calls experienced by a user and the number of missed calls experienced due to unsuccessful paging messages by the same user (MSISDN). That is, there is no discernible pattern in the collected data. This is further illustrated in view of the coefficient of determination ($R^2$) of the two data sets (i.e. indicating the proportion of variability of the data) being 0.0293, which is very low. This therefore indicates that the embodiments of the present invention relating to unreachable missed call analysis corresponds to an aspect of customer experience not associated with dropped call events which is captured by state of the art products (e.g. Nokia Traffica™ tool, AranTech Touchpoint™, etc.)

It is to be appreciated that whilst the embodiments of the invention have been described with particular reference to an unreachable event due to a network/terminal or standard problem, an additional situation where such an event could apply is in the event of an accidental or intentional device termination, such as would occur where the battery is pulled out (i.e. in this situation the terminal does not have time to initiate a network detach message). This situation is unlikely to greatly affect the analysis since it is a very rare occurrence.

Further, the embodiments of the invention have been described and illustrated through the specific figures with particular reference to a network having 2G and 3G access technologies. However, alternatively or in addition, other access technologies are envisaged such as LTE and MIMO technologies (particularly 3G MIMO techniques such as WCDMA and HSPA) or future terminal models supporting these access technologies can be addressed accordingly.

Additionally, the embodiments of the invention have been specifically described in relation to missed calls, which include missed voice and video calls. The embodiments of the invention may also be adapted for other services available on cellular networks, such as Instant Messaging, push-to-talk, etc.

The invention claimed is:

1. In a telecommunications network including a plurality of mobile terminals, a method of analysing missed call events in relation to at least one of the plurality of mobile terminals, the method including:
   determining the occurrence of a missed call event;
   recording the missed call event in a database, including an identity relating to the called terminal;
   determining and allocating a status of the called mobile terminal to the missed call event, the status selected from a plurality of options, with at least one option relating to an unreachable terminal situation; and
   analysing the missed call event data relating to unreachable situations to identify the existence of any patterns relating to a particular called terminal/user, called terminal type, location and/or time period.

2. The method of claim 1 wherein the at least one unreachable terminal status option relates to one or more of the following situations:
   a) the called terminal is registered as active in the network; and/or
   b) the called terminal was non-responsive to a paging event.

3. The method of claim 1 wherein the analysis of the missed call event data includes associating the data relating to unreachable situations with a customer experience database.

4. The method of claim 1 further including, where a pattern relating to a particular called terminal/user is identified:
   using the called terminal identity to determine a mobile terminal type of the called terminal; and
   registering a potential problem in the operation of the determined mobile terminal type in relation to the missed call event data.

5. The method of claim 4 wherein the pattern is identified when a number of unsuccessful paging events for a particular terminal or terminal type exceed a predetermined threshold.

6. The method of claim 5 further including:
   determining the rate of unsuccessful paging events per terminal type for a plurality of mobile terminal types; and
   defining a comparative benchmark of idle mode operation performance for the plurality of mobile terminal types.

7. The method of any claim 1 wherein the called terminal status is determined using a network response to an unsuccessful paging attempt.

8. In a telecommunications network including a plurality of mobile terminals, a network element for analysing missed call events in relation to at least one of the plurality of mobile terminals, the network element including a processing means and a database, the processing means being configured to:
   determine the occurrence of a missed call event;
   record the missed call event in the database, including an identity relating to the called terminal;
   determine and allocate a status of the called mobile terminal to the missed call event, the status selected from a plurality of options, with at least one option relating to an unreachable terminal situation; and
   analyse the missed call event data relating to the unreachable situations to identify the existence of any patterns relating to a particular called terminal/user, called terminal type, location and/or time period.

9. The network element of claim 8 wherein the at least one unreachable terminal status option that the processing means is configured to select from, relate to one or more of the following situations:
   a) the called terminal is registered as active in the network; and/or
   b) the called terminal was non-responsive to a paging event.

10. The network element of claim 8 wherein the processing means, in analysing the missed call event data is further configured to associate the data relating to unreachable situations with a customer experience database.

11. The network element of claim 8 wherein the processing means is further configured to:
    identify a pattern relating to a particular called terminal/user using the called user identity to determine a mobile terminal type of the called terminal; and
    register a potential problem in the operation of the determined mobile terminal type in relation to the missed call event data.

12. The network element of claim 11 wherein the processing means is configured to identify the pattern when a number of unsuccessful paging events for a particular terminal/user or terminal type exceeds a predetermined threshold.

13. The network element of claim 12 wherein the processing means is further configured to:
    determine the rate of unsuccessful paging events per terminal type for a plurality of mobile terminal types; and
    define a comparative benchmark of idle mode operation performance for the plurality of mobile terminal types.

14. The network element of claim 8 wherein the processing means is further configured to determine the called terminal status using a network response to an unsuccessful paging attempt.

15. The network element of claim 8 wherein the network element is a modified call alert application server.

* * * * *